United States Patent
Mojdehi et al.

(10) Patent No.: US 10,935,477 B2
(45) Date of Patent: Mar. 2, 2021

(54) METHOD AND APPARATUS FOR AUTOMATIC DETECTION OF ENTRAPPED GAS BUBBLE LOCATION AND REPAIRING THE SAME IN DISPENSED ADHESIVES, SEALANTS, AND MASTICS

(71) Applicant: Ford Motor Company, Dearborn, MI (US)

(72) Inventors: Ahmad Rezaei Mojdehi, Ann Arbor, MI (US); David John Hill, Ann Arbor, MI (US); Jim Derry, Clinton Township, MI (US)

(73) Assignee: Ford Motor Company, Dearborn, MI (US)

( * ) Notice: Subject to any disclaimer, the term of this patent is extended or adjusted under 35 U.S.C. 154(b) by 54 days.

(21) Appl. No.: 16/365,738

(22) Filed: Mar. 27, 2019

(65) Prior Publication Data

US 2020/0309657 A1  Oct. 1, 2020

(51) Int. Cl.
*G01N 7/00* (2006.01)
*B05D 5/10* (2006.01)
*B05D 5/00* (2006.01)
*B05D 1/26* (2006.01)
*B05C 5/02* (2006.01)

(52) U.S. Cl.
CPC ............. *G01N 7/00* (2013.01); *B05C 5/0208* (2013.01); *B05D 1/26* (2013.01); *B05D 5/005* (2013.01); *B05D 5/10* (2013.01)

(58) Field of Classification Search
CPC ....... B05C 5/0216; B05C 5/02; B05C 5/0208; B05C 11/1005; B05C 11/1013; B05C 11/08; B05C 11/10; B05C 17/005; B05D 3/007; B05D 1/02; B05D 1/26; B05D 1/265; B05D 1/30; B05D 1/305; B05D 5/10; B05D 5/005; G01N 7/00
See application file for complete search history.

(56) References Cited

U.S. PATENT DOCUMENTS 4,662,540 A * 5/1987 Schroter .................. B67D 7/32
137/12
5,480,487 A * 1/1996 Figini ..................... B05C 11/10
118/610
(Continued)

FOREIGN PATENT DOCUMENTS

KR  20170059613  5/2017

*Primary Examiner* — Michael P Wieczorek
(74) *Attorney, Agent, or Firm* — Burris Law, PLLC

(57) ABSTRACT

A method of detecting a defect in an applied volume of material includes detecting a pressure discontinuity during dispensing the volume of material along a predetermined path on a substrate. The pressure discontinuity is indicative of the defect in the applied volume of material. The location of the defect along the predetermined path is function of a start time of the pressure discontinuity and the size of the defect is a function of a time duration of the pressure discontinuity. The method can further include determining whether or not to repair the defect as a function of the location and the size of the defect in the applied volume of material. The method includes repairing the defect by re-directing the material applicator to the location of the defect and dispensing additional material at the location of the defect.

20 Claims, 5 Drawing Sheets

(56) References Cited

U.S. PATENT DOCUMENTS

Figure 1A:
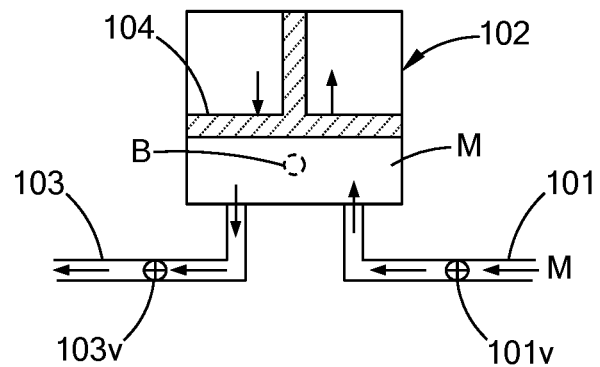

| | | | |
|---|---|---|---|
| 5,540,946 A | * | 7/1996 | DeVries ............... G05D 7/0623 |
| | | | 118/665 |
| 9,802,808 B2 | | 10/2017 | O'Dougherty et al. |
| 2005/0048196 A1 | | 3/2005 | Yanagita et al. |
| 2013/0293246 A1 | | 11/2013 | Pollack et al. |
| 2014/0252686 A1 | | 9/2014 | Bouillon et al. |

* cited by examiner

METHOD AND APPARATUS FOR AUTOMATIC DETECTION OF ENTRAPPED GAS BUBBLE LOCATION AND REPAIRING THE SAME IN DISPENSED ADHESIVES, SEALANTS, AND MASTICS

FIELD

The present disclosure relates to dispensing of adhesives, sealants, and mastics, and more particularly to methods and apparatus for detecting and repairing defects in dispensed adhesives, sealants and mastics.

BACKGROUND

The statements in this section merely provide background information related to the present disclosure and may not constitute prior art.

Adhesives, sealants and mastics have a broad range of applications due to the ability of such materials to improve stiffness, durability, stress distribution, NVH (noise, vibration and harshness) and sealing compared to mechanical fasteners and/or welding. Proper dispensing of an adhesive, sealant and/or mastic, e.g., in the form of a bead, is important for the dispensed material to provide desired adhesion, sealing, and the like. Entrapped air bubbles within an adhesive, sealant and/or mastic dispensed on a substrate can result in voids, skips and/or bond discontinuities in a bead or joint formed from such materials.

The present disclosure addresses the issues of defects in dispensed adhesives, sealants, and mastics among other issues related to dispensing adhesives, sealants, and mastics.

SUMMARY

In one form of the present disclosure, a method of detecting a defect in an applied volume of material includes detecting a pressure discontinuity during dispensing the volume of material onto a substrate and determining a location and/or size of the defect along the applied volume of material. In some aspects of the present disclosure the volume of material is applied onto the substrate using a material applicator moving across the substrate at a known rate of movement. The pressure discontinuity is indicative of the defect in the applied volume of material, the location of the defect is a function of a start time of the pressure discontinuity, and the size of the defect is a function of a time duration of the pressure discontinuity and the rate of movement of the material applicator. In some aspects of the present disclosure, the method further includes a step of determining whether or not to repair the defect as a function of the location and the size of the defect in the applied volume of material. In aspects where the method determines to repair the defect, the material applicator is redirected to the location of the defect and additional material is dispensed from the material applicator at the location of the defect. The material applicator can include a nozzle and a pressure transducer configured to measure the pressure discontinuity. The pressure transducer can be positioned within the nozzle and/or a metering device.

In some aspects of the present disclosure, a robotic material dispensing system with the nozzle dispenses the applied volume of material onto the substrate in a predefined form. The robotic material dispensing system can be positioned on an assembly line such that the volume of material is dispensed onto each of a plurality of substrates moving along the assembly line. In some aspects, the method includes dispensing the additional material at the location of a defect on a given substrate before applying the volume of material onto a subsequent substrate moving along the assembly line. The material can be an adhesive, a sealant and/or a mastic and the predefined form can be a bead. In some aspects, the material is applied to the substrate by spraying.

In another form of the present disclosure, a method of repairing a defect in an applied volume of material includes dispensing a material through a nozzle moving across a substrate along a predetermined path such that a first volume of the material is applied onto the substrate along the predetermined path in a predefined form. A pressure discontinuity is detected when a gas bubble in the material flows past a pressure transducer and the gas bubble results in a defect in the predefined form along the predetermined path. A location of the defect is determined along the predetermined path as a function of a start time of the pressure discontinuity and a size of the defect is determined as a function of a stop time of the pressure discontinuity and a rate of movement of the nozzle moving across the substrate. In some aspects of the present disclosure, the method includes determining whether or not to repair the defect. In such aspects, determining whether or not to repair the defect is a function of the location and the size of the defect in the first volume of material.

In aspects where the method includes repairing the defect, the nozzle returns to the location of the defect and dispenses a second volume of material. In such aspects, a robotic material dispensing system with the nozzle can apply the first volume of material as a bead onto a plurality of substrates moving along an assembly line. Also, the robotic material system repairs a defect along the predetermined path on a given substrate before dispensing the first volume of material onto a subsequent substrate.

In still another form of the present disclosure, a method of repairing a defect in an applied volume of material includes dispensing a material through a nozzle of a robotic material dispensing system moving across a substrate such that the material flows out of the nozzle and forms a bead along a predetermined path on the substrate. The pressure of the material flowing past a pressure transducer is monitored as the nozzle moves along the predetermined path and a pressure discontinuity is detected when a gas bubble in the material flows past the pressure detector. The gas bubble results in a defect in the bead. The location of the defect along the bead is determined as a function of a start time of the pressure discontinuity and the size of the defect is determined as a function of the stop time of the pressure discontinuity and a rate of movement of the nozzle moving along the predetermined path. The nozzle returns to the location of the defect and applies additional material at the location of the defect to repair the defect in the bead.

In some aspects of the present disclosure, the robotic material dispensing system dispenses the bead of material on a plurality of substrates moving along an assembly line and returns to the location of a defect detected on a given substrate and repairs the defect on the given substrate before applying material to a subsequent substrate moving along the assembly line.

Further areas of applicability will become apparent from the description provided herein. It should be understood that the description and specific examples are intended for purposes of illustration only and are not intended to limit the scope of the present disclosure.

DRAWINGS

Figure 1:
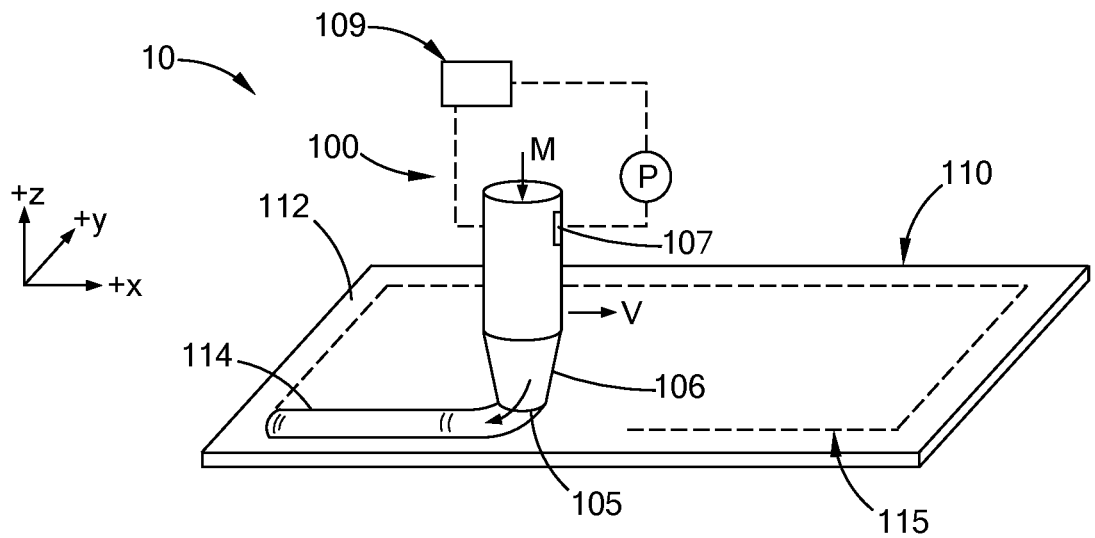
Figure 2:
Figure 3:
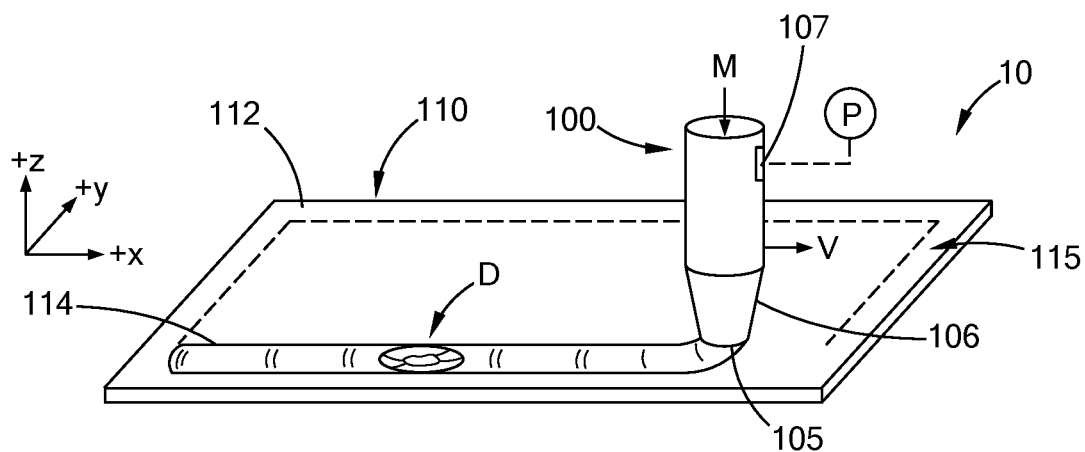
Figure 4:
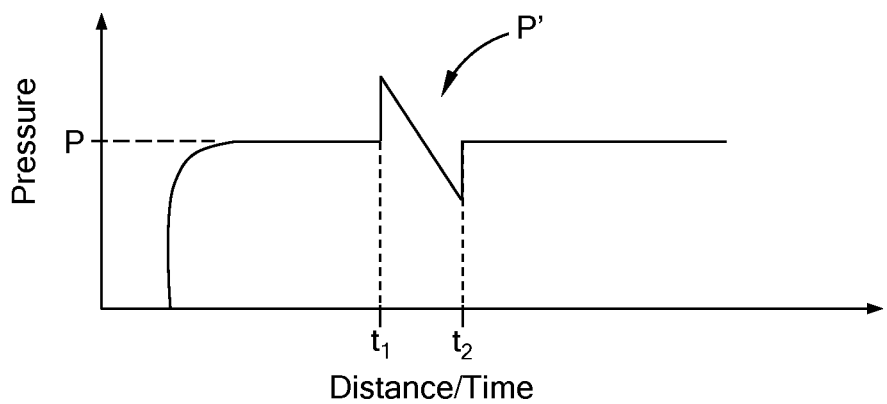
Figure 5:
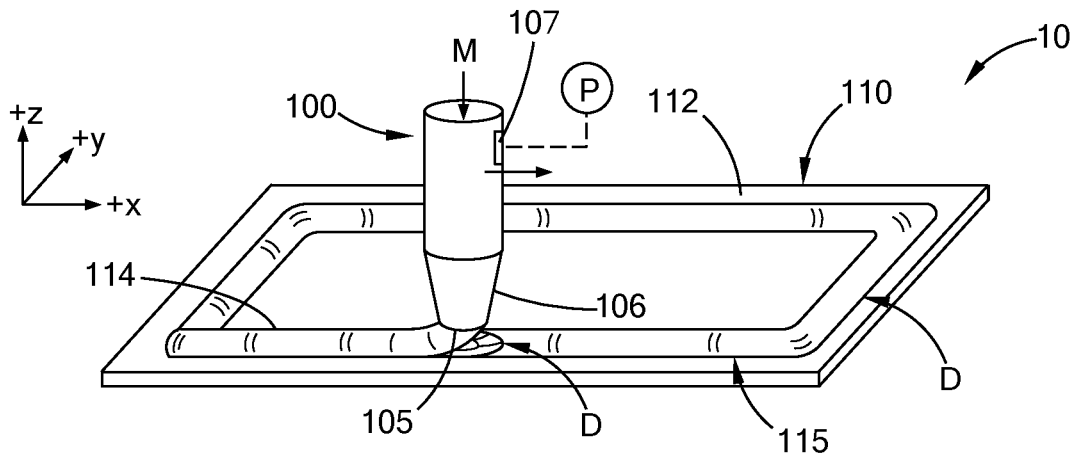
Figure 6:
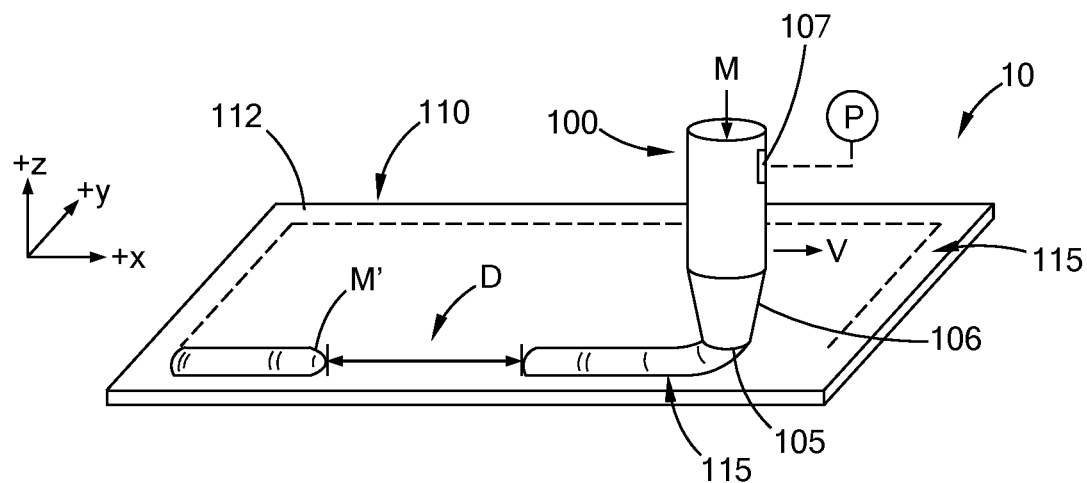
Figure 7:
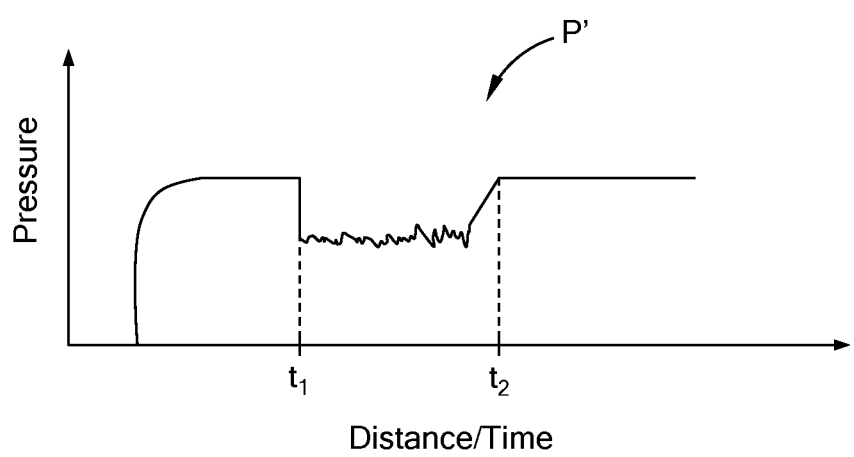
Figure 8:
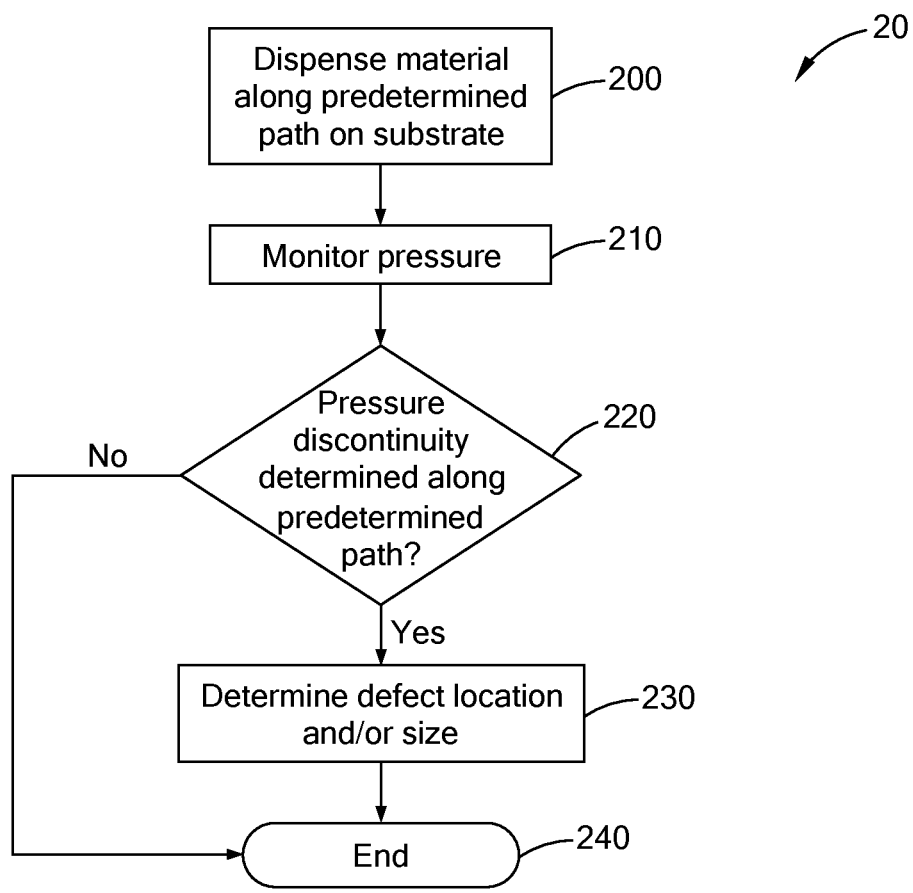
Figure 9:
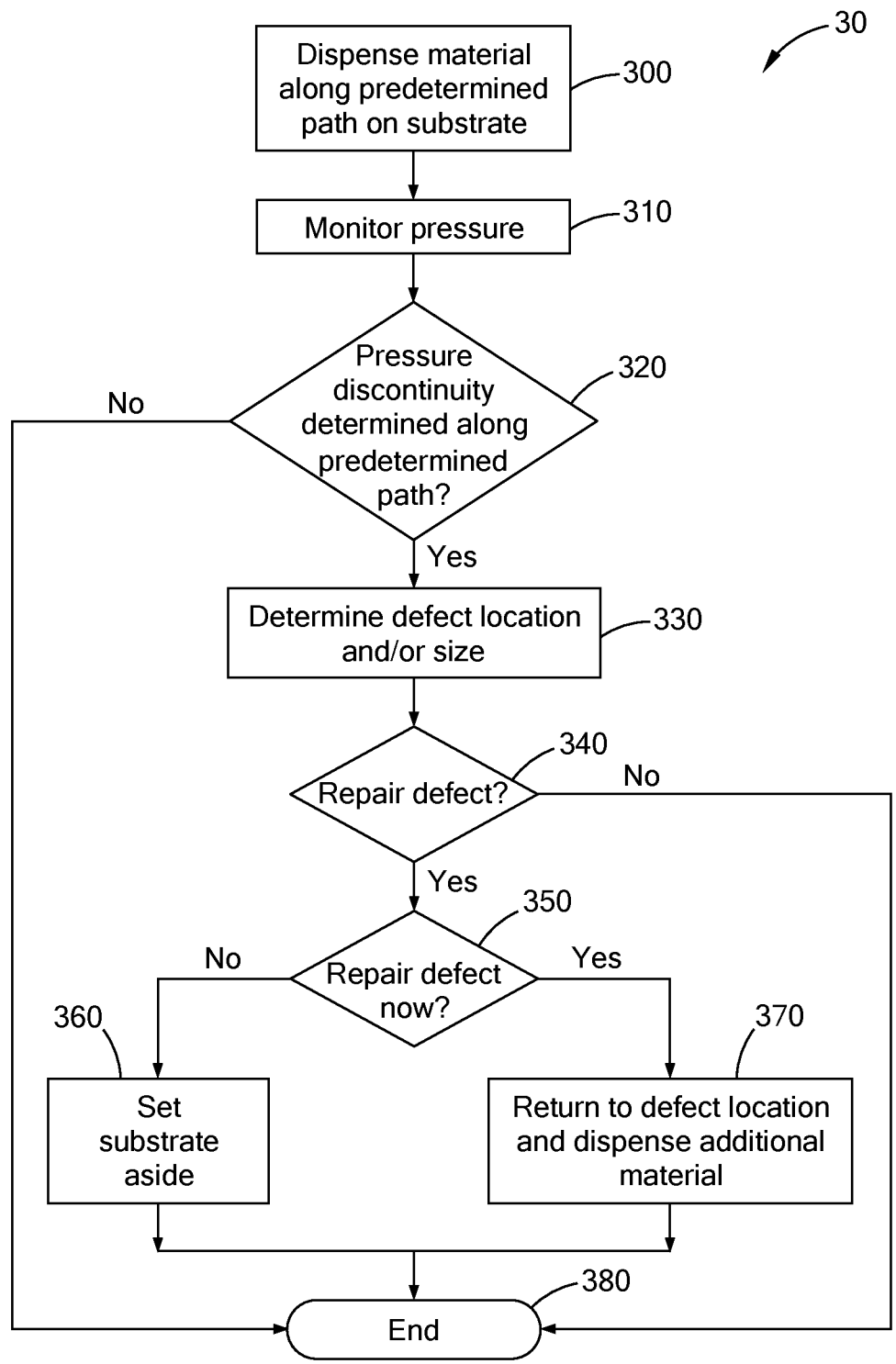

In order that the disclosure may be well understood, there will now be described various forms thereof, given by way of example, reference being made to the accompanying drawings, in which:

FIG. 1 schematically depicts a perspective view of an apparatus dispensing a volume of material on a substrate according to the teachings of the present disclosure;

FIG. 1A schematically depicts a fixed volume accumulator for providing a desired volume of material to the apparatus in FIG. 1;

FIG. 2 graphically depicts pressure applied to the material being dispensed in FIG. 1 as a function of distance according to the teachings of the present disclosure;

FIG. 3 schematically depicts a perspective view of a defect in a volume of material dispensed on the substrate in FIG. 1;

FIG. 4 graphically depicts detection of a pressure discontinuity due to the defect in the volume of material dispensed in FIG. 3 according to the teachings of the present disclosure;

FIG. 5 schematically depicts a perspective view of the apparatus in FIG. 1 repairing the defect in the volume of material in FIG. 3;

FIG. 6 schematically depicts a perspective view of another defect in a volume of material dispensed on the substrate in FIG. 1;

FIG. 7 graphically depicts detection of a pressure discontinuity due to the defect in the volume of material dispensed in FIG. 6 according to the teachings of the present disclosure;

FIG. 8 schematically depicts a flow chart for a method of repairing a defect in an applied volume of material according to the teachings of the present disclosure; and FIG. 9 schematically depicts a flow chart for a method of repairing a defect in an applied volume of material according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIGS. 1 and 1A, an apparatus 10 for detecting a defect in an applied volume of material 'M' includes a robotic material dispensing system 100 with a material applicator 106 (e.g., a nozzle 106). The robotic material dispensing system 100 is configured to dispense the volume of material M in a predefined profile or form 114 (e.g., a bead) along a predetermined path 115 on a surface 112 of a substrate 110. While FIG. 1 schematically depicts the material M flowing downwardly (−z direction) out of the nozzle 106, in some aspects of the present disclosure the material M can be dispensed from the nozzle 106 sideways (x or y directions) and/or vertically (+z direction) onto the surface 112 of the substrate 110 to form the predefined form 114 along the predetermined path 115. In some aspects the material M is sprayed from the nozzle 106 as a plurality of droplets to form the predefined form 114 along the predetermined path 115. Accordingly, it should be understood that the material M is a material that flows under pressure, e.g., a liquid material.

In some aspects of the present disclosure, the robotic material dispensing system 100 includes a fixed volume accumulator 102 with an inlet line 101, an outlet line 103, and a piston 104. The inlet line 101 includes an inlet valve 101v and the outlet line includes an outlet valve 103v. The inlet valve 101v and the outlet valve 103v each have an open position such that the material M can flow therethrough and a closed position such that the material M is prevented from flowing therethrough. The material M is provided to the nozzle 106 via the fixed volume accumulator 102. For example, the inlet line 101 can be in fluid communication with a supply of material M (e.g., a barrel of material M (not shown)) such that the material M is pumped (e.g., via pressure) into the fixed volume accumulator 102 when the inlet valve 101v is in the open position, the exit valve 103v is in the closed position, and the piston 104 moves in a fill direction (+z direction depicted in the figures). After a desired volume of material M is drawn into the fixed volume accumulator 102, the inlet valve 101v is actuated into the closed position, the outlet valve 103v is actuated into the open position, and the piston 104 moves in an expel direction (-z direction depicted in the figures) such that the material M is expelled (forced) from the fixed volume accumulator 102 into and through the outlet line 103. The material M flows through the outlet line 103 to the nozzle 106 and upon reaching the nozzle 106 flows through an open end 105 of the nozzle 106. The piston 104 moves in the expel direction (−z direction) at a predefined rate of movement. Also, the nozzle 106 moves across the surface 112 at a predefined distance from the surface 112 (+z direction) and at a predefined rate of movement 'V' such that the predefined form 114 of the material M is formed and applied to the surface 112 along the predetermined path 115 as schematically depicted in FIG. 1.

In some aspects of the present disclosure, the material M flows past a pressure transducer 107 that measures a pressure 'P' of the material M flowing through the exit line 103 and/or nozzle 106 is monitored. Also, the pressure P of the material M flowing past the pressure transducer 107 as a function of distance traveled by the nozzle 106 is monitored as graphically shown in FIG. 2. For example, the robotic material dispensing system 100 can include an electronic control unit (ECU) 109 configured to monitor the distance and/or time the nozzle 106 has traveled along the predetermined path 115 and the pressure P of the material M flowing past the pressure transducer 107. In the event a pressure discontinuity occurs during the dispensing of the volume of material M as described in greater detail below, the ECU 109 determines the distance and/or time the nozzle 106 has traveled along the predetermined path 115 when the pressure discontinuity occurs.

It should be understood that one or more gas bubbles (e.g., an air bubble) can be present in the supply of material M (not shown) from which material M is drawn into the fixed volume accumulator 102 (FIG. 1A). Accordingly, a gas bubble 'B' can be present in the material M in the fixed volume accumulator 102. Also, such a gas bubble B flows through the nozzle 106 and past the pressure transducer 107 when the material M is expelled from the fixed volume accumulator 102 to form the predefined form 114 on the surface 112 of the substrate 110. It should also be understood that the gas bubble B, being devoid of material M, results in a defect 'D' in the predefined form 114 as schematically depicted in FIG. 3.

Referring now to FIGS. 3 and 4, as the nozzle 106 moves along the predetermined path 115 and dispenses a first volume of material M onto the surface 112, the gas bubble B flows past the pressure transducer 107 (not shown) and a pressure discontinuity P' (e.g., a pressure spike) of the pressure P occurs. Particularly, the pressure detected by the pressure transducer 107 is disrupted when the bubble B flows past the pressure transducer 107. Accordingly, the pressure discontinuity P' has a start time $t_1$, a stop time $t_2$, and a duration equal to the difference between the stop time $t_2$ and the start time $t_1$ (i.e., $t_2-t_1$). In some aspects of the present disclosure, the robotic material dispensing system 100 (e.g., using the ECU 109) determines a first position (e.g., a first $x_1$, $y_1$, $z_1$ coordinate) along the predefined path 105 at the start time $t_1$ and a second position (e.g., a second $x_2$, $y_2$, $z_2$ coordinate) along the predefined path 105 at the stop time $t_2$. In such aspects, the size of the defect D is determined from the first position and the second position, i.e., the defect D extends between the first position and the second position. In other aspects of the present disclosure, the start time $t_1$, stop time $t_2$, and the known rate of movement 'V' of the nozzle 106 moving across the surface 112 along the predetermined path 115 provides for the position or location of the pressure discontinuity P' to be plotted as a function of the distance and/or time traveled by the nozzle 106 (FIG. 4) such that the position or location of the defect D is determined by the ECU 109 (FIG. 1).

In some aspects of the present disclosure the robotic material dispensing system 100 returns (re-directs) the nozzle 106 to the location of the defect D along the predetermined path 115 and repairs the defect D by applying a second volume of material M at the defect D location as schematically depicted in FIG. 5.

Referring now to FIGS. 6 and 7, an example of defect D in the form of a "skip" is schematically depicted in FIG. 6 and a pressure discontinuity P' corresponding to the skip is graphically depicted in FIG. 7. It should be understood that the length or duration of the pressure discontinuity P' in FIG. 7 corresponds to the length of the defect D in FIG. 6. Accordingly, the location and size (e.g., length) of the defect D is determined by the robotic material dispensing system 100 (e.g., using the ECU 109) as described above. In addition, in some aspects of the present disclosure the robotic material dispensing system 100 determines whether or not to repair the defect D in the predefined form 114 as a function of the location and/or size of the defect D along the predetermined path 115. For example, in some aspects of the present disclosure, the robotic material dispensing system 100 applies the volume of material M to increase strength, stiffness, sealing and the like of the substrate 110. In such aspects, small defects D (e.g., defect D shown in FIG. 3) and large defects D (e.g., defect D shown in FIG. 6) are repaired. Non-limiting examples of such applications include full water or air sealing between two components (e.g., installment and sealing of a windshield on a vehicle) where even a small pin hole may result in a leak or quality concern. In other aspects of the present disclosure, small defects D (e.g., defect D shown in FIG. 3) may not be repaired, however large defects D (e.g., defect D shown in FIG. 6) are repaired. For example, in some applications a continuous bead of material M on the substrate 110 is not required or needed, however, a continuous bead is dispensed rather than repeatedly starting and stopping dispensing of the material M. In such applications, a small defect D in the continuous bead of material M on the substrate 110 may not require repair. In addition, the robotic material dispensing system 100 can determine whether or not the defect D is repaired by the robotic material dispensing system 100 before applying material M to another substrate 110 (e.g., "in-cycle" repair), or in the alternative, if the substrate 110 is set aside and repaired at a later time, at a different station, etc. (e.g., "out-line" repair).

While FIGS. 1, 3 and 6 schematically depict the pressure transducer 107 spaced apart from the open end 105, in some aspects of the present disclosure, the pressure transducer 107 is positioned at other locations within and/or between the fixed volume accumulator 104, exit line 103 and open end 105 of the nozzle 106. For example, given the known rate of movement of the nozzle 106 along the predetermined path 115 and the known rate of movement of the piston 104 in the accumulator expel direction (-z direction), a corresponding rate of flow (i.e., volumetric flow rate) of the material M through the exit line 103 and the nozzle 106 is known. Accordingly, a location of the defect along the predetermined path 115 is calculated from the position of the pressure discontinuity P' on the pressure P versus distance and/or time plot (FIGS. 4, 7), the known rate of movement of the nozzle 106 moving along the predetermined path 115, and the known volumetric flow rate of material M through the nozzle 106. In some aspects of the present disclosure the pressure transducer 107 is positioned within the fixed volume accumulator 102. In other aspects of the present disclosure, the pressure transducer 107 is positioned within the outlet line 103. In still other aspects of the present disclosure, the pressure transducer 107 is positioned at the open end 105 of the nozzle 106. Also, it should be understood that more than one pressure transducer 107 can be provided, for example a first pressure transducer 107 positioned within the fixed volume accumulator 102 and second pressure transducer 107 positioned within the nozzle 106 proximate and/or directly adjacent to the open end 105.

Referring now to FIGS. 3, 4 and 8, a method 20 for determining a location of a defect D in an applied volume of material M along a predetermined path 115 in a predefined form 114 is shown. Particularly, the method 20 includes dispensing material M on the surface 112 of the substrate 110 along the predetermined path 115 at step 200 and monitoring pressure of the material M as it flows past the pressure transducer 107 at step 210. At step 220 the method 20 determines whether or not a pressure discontinuity P' is detected during application of the material M along the predetermined path 115. In some aspects of the present disclosure, a pressure discontinuity P' is not detected and the method proceeds to step 240. In other aspects of the present disclosure, a pressure discontinuity P' is detected and the method proceeds to step 230 where the robotic material dispensing system 100 determines the location and/or size of the defect before proceeding to step 240. It should be understood the method 20 can include applying material M in the predefined form 114 onto another substrate 110, e.g., on an assembly line, before or after step 240. For example, the method 20 can return to step 200 after step 220 when no pressure discontinuity P' is detected and/or return to step 200 after step 230 when a pressure discontinuity P' is detected.

Referring now to FIGS. 3-5 and 9, a method 30 for repairing a defect D in an applied volume of Material M along a predetermined path 115 in a predefined form 114 is shown. Particularly, the method 30 includes dispensing material M on the surface 112 of the substrate 110 along the predetermined path 115 at step 300 and monitoring pressure of the material M as it flows past the pressure transducer 107 at step 310. At step 320 the method 30 determines whether or not a pressure discontinuity P' is detected during dispensing of the material M along the predetermined path 115. In some aspects of the present disclosure, a pressure discontinuity P' is not detected and the method proceeds to step 380. In other aspects of the present disclosure, a pressure discontinuity P' is detected and the method proceeds to step 330 where the robotic material dispensing system 100 determines the location and/or size of the defect before proceeding to step 340. At step 340 the method 30 determines whether or not to repair the defect. In some aspects of the present disclosure the method 30 determines not to repair the defect D and proceeds to step 380. In other aspects of the present disclosure the method 30 determines to repair the defect D and proceeds to step 350. In such aspects the method 30 determines whether or not to repair the defect before proceeding to apply material M to another substrate 110 (i.e., "Repair Defect Now?") at step 350. It should be understood that "in-cycle" repair is provided when there is sufficient cycle time available for repair of the defect D without causing downstream delays. That is, if a repair time exceeds an available cycle time, then an "off-line" repair, either manual or automated, may be preferred. In some aspects of the present disclosure, an important parameter of the methods disclosed herein is the location of the defect D along the predetermined path 115. That is, the location of the defect D along the predetermined path 115 can be transferred electronically to a secondary automated system configured to repair the defect D. In the alternative, the location of the defect D can be physically identified or shown to an individual by projecting an image or zone of the effect onto the bead such that the defect D can be manually repaired. In aspects where the method 30 determines not to repair the defect D before applying material M to another substrate 110 the method 30 proceeds to step 360 where the substrate 110 is set aside such that the defect D can be repaired at a later time, different station, etc., before proceeding to step 380. In aspects where the method 30 determines to repair the defect D before applying material M to another substrate 110, the method 30 proceeds to step 370 where the nozzle 106 is re-directed back (returns) to the location of the defect D and additional material M is applied to the defect location by the robotic material dispensing system 100 (FIG. 5) before proceeding to step 380. It should be understood that the method 30 can include applying material M in the predefined form 114 onto another substrate 110, e.g., on an assembly line, before or after step 380. For example, the method 30 can return to step 300 after step 320 when no pressure discontinuity P' is detected, return to step 300 after step 340 when the method 30 determines not to repair the defect D, return to step 300 after step 360 where the previous substrate 110 is set aside and/or after step 370 where the defect D is repaired.

Non-limiting examples of materials applied to surfaces using the robotic material dispensing system and methods described herein include adhesives, sealants and mastics.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of detecting a defect in an applied volume of material comprising:

detecting a pressure discontinuity during dispensing a volume of material onto a substrate using a material applicator, the pressure discontinuity being indicative of a defect in the applied volume of material;

determining a location of the defect along the applied volume of material as a function of a start time of the pressure discontinuity; and determining a size of the defect on the substrate as a function of a first position on the substrate at a start of the pressure discontinuity and a second position on the substrate at an end of the pressure discontinuity.

2. The method according to claim 1 further comprising a step of determining whether or not to repair the defect as a function of the location and the size of the defect in the applied volume of material.

3. The method according to claim 1 further comprising repairing the defect by re-directing the material applicator to the location of the defect and dispensing additional material from the material applicator onto the location of the defect.

4. The method according to claim 1 further comprising manually repairing the defect.

5. The method according to claim 4, wherein the location and size of the defect along the applied volume of material is visually displayed on the substrate for an individual manually repairing the defect.

6. The method according to claim 1 further comprising a robotic material dispensing system with a nozzle, wherein the applied volume of material is dispensed and applied to the substrate through the nozzle.

7. The method according to claim 6 further comprising the robotic material dispensing system dispensing the volume of material onto a plurality of substrates moving along an assembly line.

8. The method according to claim 7, wherein the nozzle is re-directed to and dispenses the additional material at the location of a defect on a given substrate before applying the volume of material onto a subsequent substrate moving along the assembly line.

9. The method according to claim 8, wherein the robotic material dispensing system dispenses at least one of a bead of adhesive, a bead of sealant and a bead of mastic on a plurality of motor vehicle part substrates moving along the assembly line.

10. The method according to claim 1, wherein the material is applied to the substrate by spraying, streaming, or swirling.

11. The method according to claim 1, wherein the volume of material is applied onto the substrate as a bead.

12. A method of repairing a defect in an applied volume of material comprising:

dispensing a material through a nozzle moving across a substrate such that a first volume of the material is applied onto the substrate along a predetermined path in a predefined form;

detecting a pressure discontinuity when a gas bubble in the material flows past a pressure transducer, wherein the gas bubble in the material causes a defect in the predefined form along the predetermined path;

determining a location of the defect along the predetermined path as a function of a start time of the pressure discontinuity;

determining a size of the defect on the substrate along the predetermined path as a function of a stop time of the pressure discontinuity and a rate of movement of the nozzle moving across the substrate; and determining whether or not to repair the defect.

13. The method according to claim 12, wherein determining whether or not to repair the defect is a function of the location and the size of the defect in the first volume of material.

14. The method according to claim 12 further comprising repairing the defect by dispensing a second volume of material at the location of the defect.

15. The method according to claim 12 further comprising a robotic material dispensing system with the nozzle, wherein the robotic material dispensing system applies the first volume of material as a bead onto a plurality of substrates moving along an assembly line.

16. The method according to claim 15, wherein the robotic material system repairs a defect along the predetermined path on a given substrate before dispensing the first volume of material onto a subsequent substrate.

17. The method according to claim 16, wherein the material comprises at least one of an adhesive, a sealant and a mastic.

18. A method of repairing a defect in an applied volume of material comprising:
dispensing a material through a nozzle of a robotic material dispensing system moving along a predetermined path across a substrate such that the material flows out of the nozzle and forms a bead along the predetermined path on the substrate;
monitoring the pressure of the material flowing past a pressure detector as the nozzle moves along the predetermined path;
detecting a pressure discontinuity when a gas bubble in the material moves past the pressure detector, wherein the gas bubble causes a defect in the bead;
determining a location of the defect on the substrate along the predetermined path as a function of a start time of the pressure discontinuity and determining a size of the defect on the substrate as a function of a first position on the substrate at a start of the pressure discontinuity and a second position on the substrate at an end of the pressure discontinuity; and
returning the nozzle to the location of the defect and applying additional material at the location of the defect to repair the defect in the bead.

19. The method according to claim 18, wherein the robotic material dispensing system dispenses the bead of material on a plurality of substrates moving along an assembly line and returns to the location of a defect detected on a given substrate and repairs the defect on the given substrate before applying material to a subsequent substrate moving along the assembly line.

20. The method according to claim 18, wherein the material comprises at least one of an adhesive, a sealant, and a mastic.

* * * * *